United States Patent [19]
Doherty et al.

[11] Patent Number: 6,014,128
[45] Date of Patent: Jan. 11, 2000

[54] DETERMINING OPTIMAL PULSE WIDTH MODULATION PATTERNS FOR SPATIAL LIGHT MODULATOR

[75] Inventors: Donald B. Doherty, Richardson; Mark L. Burton; Vishal Markandey, both of Dallas, all of Tex.

[73] Assignee: Texas Instruments Incorporated, Dallas, Tex.

[21] Appl. No.: 08/719,529

[22] Filed: Sep. 27, 1996

Related U.S. Application Data

[60] Provisional application No. 60/004,411, Sep. 27, 1995.

[51] Int. Cl.$^7$ .................................................. G09G 3/34
[52] U.S. Cl. ............................. 345/148; 345/84; 345/89; 345/147
[58] Field of Search .................. 345/84, 89, 48, 345/50, 51, 85, 87, 147, 148, 437

[56] References Cited

U.S. PATENT DOCUMENTS

| | | |
|---|---|---|
| 5,229,860 | 7/1993 | Kido et al. ............................ 348/625 |
| 5,278,652 | 1/1994 | Urbanus et al. . |
| 5,497,172 | 3/1996 | Doherty et al. ........................ 345/85 |
| 5,596,349 | 1/1997 | Kobayashi et al. .................... 345/147 |
| 5,657,036 | 8/1997 | Markandey et al. .................... 345/85 |
| 5,777,589 | 7/1998 | Gale et al. ............................ 345/84 |

*Primary Examiner*—Steven J. Saras
*Assistant Examiner*—Alecia D. Nelson
*Attorney, Agent, or Firm*—Charles A. Brill; Frederick J. Telecky, Jr.; Richard L. Donaldson

[57] ABSTRACT

A method of evaluating pulse width modulation patterns for a spatial light modulator display device. The method makes use of a light difference series function. This series function is obtained by representing on or off times of a display element as a light function. (FIG. 3). Two such light functions can be subtracted to compare two different patterns on the same display element (interframe) or to compare the same pattern on different display elements (intraframe). (FIG. 4). The result of the subtraction is a light difference function (FIG. 5), which can be expressed as a series function. Mathematical expressions using the series function correlate to various optical characteristics.

11 Claims, 1 Drawing Sheet

DETERMINING OPTIMAL PULSE WIDTH MODULATION PATTERNS FOR SPATIAL LIGHT MODULATOR

This application claims benefit of provisional application 60,004,411 filed Sep. 27, 1995.

TECHNICAL FIELD OF THE INVENTION

This invention relates to image display systems using spatial light modulators (SLMs), and more particularly to methods of determining optimal pulse width modulation patterns for data to be displayed by the SLM.

BACKGROUND OF THE INVENTION

Video display systems based on spatial light modulators (SLMs) are increasingly being used as an alternative to display systems using cathode ray tubes (CRTs). SLM systems provide high resolution displays without the bulk and power consumption of CRT systems.

Digital micro-mirror devices (DMDs) are a type of SLM, and may be used for either direct-view or projection display applications. A DMD has an array of micro-mechanical display elements, each having a tiny mirror that is individually addressable by an electronic signal. Depending on the state of its addressing signal, each mirror tilts so that it either does or does not reflect light to the image plane. Each mirror and its associated circuitry is often referred to as a "pixel", to correspond to the pixels of the image that they generate, but they are more correctly referred to as "display elements". Generally, displaying pixel data is accomplished by loading data to memory cells connected to the display elements. The display elements can maintain their on or off state for controlled display times.

Other SLMs operate on similar principles, with an array of display elements that may emit or reflect light simultaneously, such that a complete image is generated by addressing display elements rather than by scanning a screen. Another example of an SLM is a liquid crystal display (LCD) having individually driven display elements.

To achieve intermediate levels of illumination, between white (on) and black (off), pulse-width modulation (PWM) techniques are used. The basic PWM scheme involves first determining the rate at which images are to be presented to the viewer. This establishes a frame rate and a corresponding frame period. For example, in a standard television system, images are transmitted at 30 frames per second, and each frame lasts for approximately 33.3 milliseconds. Then, the intensity resolution for each pixel is established. In a simple example, and assuming n bits of resolution, the frame time is divided into $2^n-1$ equal time slices. For a 33.3 millisecond frame period and n-bit intensity values, the time slice is $33.3/(2^n-1)$ milliseconds.

Having established these times, for each pixel of each frame, pixel intensities are quantized, such that black is 0 time slices, the intensity level represented by the LSB is 1 time slice, and maximum brightness is $2^n-1$ time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing SLMs, PWM calls for the data to be formatted into "bit-planes", each bit-plane corresponding to a bit weight of the intensity value. Thus, if each pixel's intensity is represented by an n-bit value, each frame of data has n bit-planes. Each bit-plane has a 0 or 1 value for each display element. In the simple PWM example described in the preceding paragraphs, during a frame, each bit-plane is separately loaded and the display elements addressed according to their associated bit-plane values. For example, the bit-plane representing the LSBs of each display element is displayed for 1 time slice, whereas the bit-plane representing the MSBs is displayed for $2n/2$ time slices. Because a time slice is only $33.3/(2^n-1)$ milliseconds, the SLM must be capable of loading the LSB bit-plane within that time. The time for loading the LSB bit-plane is the "peak data rate".

U.S. Pat. No. 5,278,652, entitled "DMD Architecture and Timing for Use in a Pulse-Width Modulated Display System", assigned to Texas Instruments Incorporated describes various methods of addressing a DMD in a DMD-based display system. These methods are directed to reducing the peak data rate while maintaining optical efficiency. Some of the methods discussed therein include clearing blocks of display element elements and using extra "off" times to load data. In one method the time in which the most significant bit is displayed is broken into smaller segments so as to permit loading for less significant bits to occur during these segments.

Another method of reducing the peak data rate is referred to as "memory multiplexing" or "split reset". This method uses a specially configured SLM, whose display elements are grouped into reset groups that are separately loaded and addressed. This reduces the amount of data to be loaded during any one time, and permits the LSB data for each reset group to be loaded at a different time during the frame period. This configuration is described in U.S. patent Ser. No. 08/300,356, entitled "Pixel Control Circuitry for Spatial Light Modulator", assigned to Texas Instruments Incorporated.

Regardless of whether or not the display elements of the SLM are addressed all at once or in reset groups, the resulting display must have minimal visual artifacts. The presence and extent of artifacts can vary with the image's temporal content or with the viewer's eye motion. Various techniques of ordering and timing the display of data have been developed to reduce these artifacts.

SUMMARY OF THE INVENTION

One aspect of the invention is a method of analyzing the perceptual aspects of pulse width modulation patterns. The method can be used to compare the integrated light response of different display elements in the same frame (intraframe) or of the same or different display elements in different frames (interframe). More specifically, the method evaluates a bit sequence pattern for a pulse width modulated display of image data, which is formatted into a sequence of on or off values of display elements of a display device during a frame period, each sequence providing a light intensity.

For an interframe comparison, a first light function, representing on or off values of a display element during a first series of time intervals that comprise one frame period is specified. Then, a second light function, representing on or off values of that display element during a second series of time intervals that comprise a next frame period, is specified. The second light function is subtracted from the first light function, thereby providing a light difference function. Values of this light difference function are summed, thereby providing a light difference series function. This series function is used to mathematically derive a value representing an optical characteristic of said pattern.

A technical advantage of the invention is that it facilitates the development of PWM patterns that minimize visual artifacts. The light difference series function represents a comparison of two perceptual responses. Algorithms based on the light difference series function can be used to evaluate the patterns for different visual characteristics, such as uniformity, symmetry, and transition effects.

For SLMs that do not have reset groups, the same PWM pattern can be compared in adjacent frames. This ensures that there are no "visual gaps", for example as in a transition from intensity level 127 to 128 in an 8-bit system where bit-weights are ordered in ascending or descending order. For SLMs having reset groups, different PWM patterns can be compared during the same frame period, to make sure there are no line-to-line artifacts. In either case, the intensity can be held constant or varied.

DETAILED DESCRIPTION OF THE INVENTION

Overview of SLM Display Systems Using PWM

A comprehensive description of a DMD-based digital display system is set out in U.S. Pat. No. 5,079,544, entitled "Standard Independent Digitized Video System", and in U.S. patent Ser. No. 08/147,249, entitled "Digital Television System", and in U.S. patent Ser. No. 08/146,385, entitled "DMD Display System". Each of these patents and patent applications is assigned to Texas Instruments Incorporated, and each is incorporated by reference herein. An overview of such systems is discussed below in connection with FIGS. 1 and 2.

Figure 1:
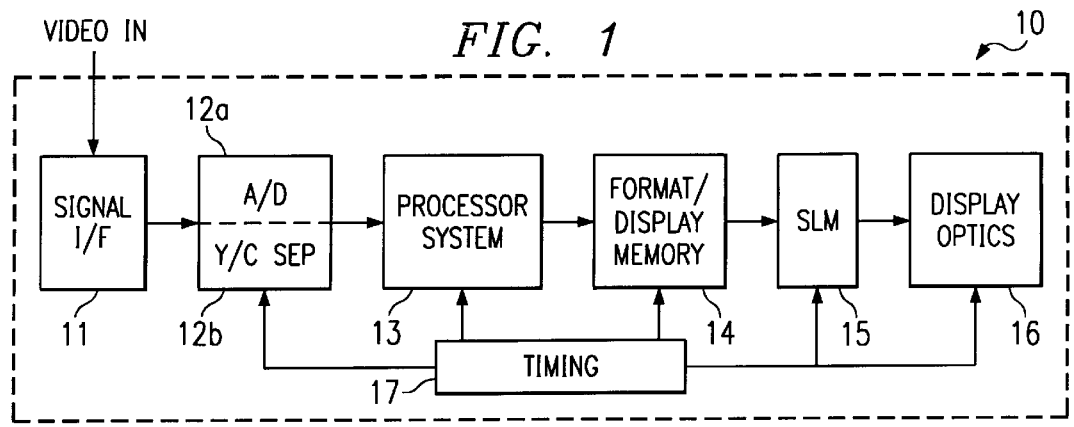
FIG. 1 is a block diagram of a display system that generates images from an analog signal.
Figure 2:
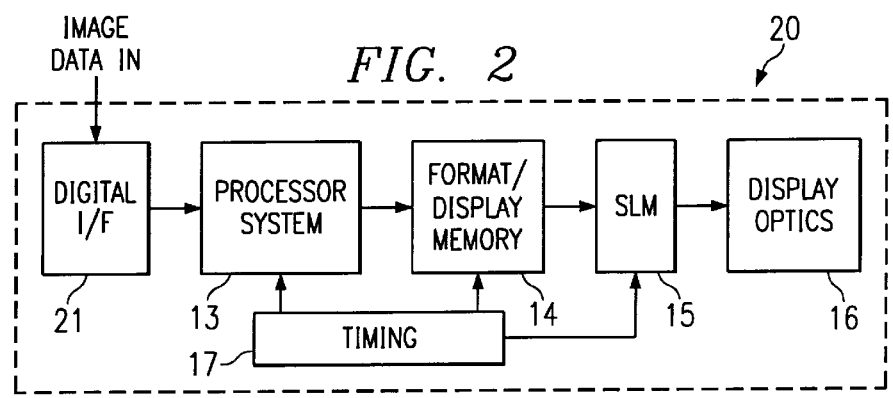
FIG. 2 is a block diagram of a display system that generates images from a digital signal.

FIG. 1 is a block diagram of a projection display system 10, which uses an SLM 15 to generate real-time images from an analog video signal, such as a broadcast television signal. FIG. 2 is a block diagram of a similar system 20, in which the input signal already represents digital data. In both FIGS. 1 and 2, only those components significant to main-screen pixel data processing are shown. Other components, such as might be used for processing synchronization and audio signals or secondary screen features, such as closed captioning, are not shown.

Signal interface unit 11 receives an analog video signal and separates video, synchronization, and audio signals. It delivers the video signal to A/D converter 12a and Y/C separator 12b, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion, using analog filters.

Processor system 13 prepares the data for display, by performing various pixel data processing tasks. Processor system 13 may include whatever processing memory is useful for such tasks, such as field and line buffers. The tasks performed by processor system 13 may include linearization (to compensate for gamma correction), colorspace conversion, scaling, and progressive scan conversion. The order in which these tasks are performed may vary.

Display memory 14 receives processed pixel data from processor system 13. It formats the data, on input or on output, into "bit-plane" format, and delivers the bit-planes to SLM 15 one at a time. As discussed in the Background, the bit-plane format permits each display element of SLM 15 to be turned on or off in response to the value of 1 bit of data at a time. In the example of this description, this formatting is performed by hardware associated with display memory 14. However, in other embodiments, the formatting could be performed by processor system 13 or by dedicated formatting hardware in the data path before or after display memory 14.

In a typical display system 10, display memory 14 is a "double buffer" memory, which means that it has a capacity for at least two display frames. The buffer for one display frame can be read out to SLM 15 while the buffer another display frame is being written. The two buffers are controlled in a "ping-pong" manner so that data is continuously available to SLM 15.

The bit-plane data from display memory 14 is delivered to SLM 15. Although this description is in terms of a DMD-type of SLM 15, other types of SLMs could be substituted into display system 10 and used for the invention described herein. For example, SLM 15 could be an LCD-type SLM. Details of a suitable SLM 15 are set out in U.S. Pat. No. 4,956,619, entitled "Spatial Light Modulator", which is assigned to Texas Instruments Incorporated and incorporated by reference herein. Essentially, SLM 15 uses the data from display memory 14 to address each display element of its display element array. The "on" or "off" state of each display element forms an image.

Display optics unit 16 has optical components for receiving the image from SLM 15 and for illuminating an image plane such as a display screen. For color displays, the display optics unit 16 could include a color wheel, and bit-planes for each color could be sequenced and synchronized to the color wheel. Or, the data for different colors could be concurrently displayed on multiple SLMs and combined by display optics unit 16. Master timing unit 17 provides various system control functions.

PWM Pattern Evaluation

For purposes of this invention, a "PWM pattern" or simply "pattern" is a sequence in which bit-weights are displayed during one frame period. As a simple example, using 8-bit pixel data, each bit-weight might be displayed in a pattern of descending order: 7, 6, 5, 4, 3, 2, 1, 0. Other patterns might order the bit-weights differently. Also, the display times of one or more of the bit-weights might be segmented, such that the bit-weight is loaded more than once per frame, and after each load, displayed for a portion of the total display time for the frame.

As described in the Background, when the data is formatted by bit-weight, one bit per display element for each bit-weight, the result is a "bit-plane" format. For global reset SLMs (those that do not have reset groups), the bit-plane includes the data for all display elements, and is loaded and reset at one time. For SLM's having reset groups, the bit-plane is divided among the reset groups and is reset at different times. Thus, the PWM pattern may be thought of as an ordering of bit-planes.

Typically, for a global reset SLM, the same PWM pattern is used for every display element and repeated for every frame. Thus, for a global reset SLM, a typical use of the invention is to compare the same pattern on the same display element in adjacent frames.

For an SLM that is reset in groups, the PWM pattern typically varies within the same frame between reset groups. This may occur as a result of "staggered" loading sequences from reset group to reset group or because less significant bit weights are ordered differently among reset groups. Thus, for split reset SLMs, a typical use of the invention is to compare different patterns on neighboring display elements in the same frame. In either case, the intensity can stay the same or be changed.

In general, regardless of whether the SLM is for global or split reset, any one of the parameters (intensity, frame period, and pattern) can be varied for a particular comparison.

In the example of this description, the analysis is performed on a display element-by-display element basis. However, this is for simplicity of description, and any number of display elements could be used.

To analyze a particular PWM pattern, a display element is turned on or off in accordance with that pattern. Then, as one example, the same display element may be turned on or off in accordance with the same pattern in an adjacent frame period. Or, as another example, an adjacent display element is turned on or off in accordance with a different pattern in the same frame period. In either case, the result is two light functions, which are the basis for comparing the two displays.

For a particular pattern, say Pattern A, a light function, $L_A$, is defined in terms of intensity, i, and the sequence number, t, of a time slice within a frame. The light function has two values, 0 and 1, where $L_A(i,t)=1$ when display element is on
$L_A(i,t)=0$ when display element is off.

Figure 3A:
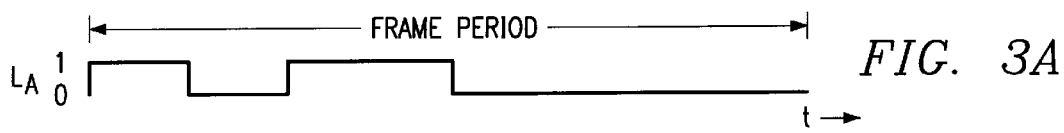
FIG. 3A illustrates a first light function.
Figure 3B:
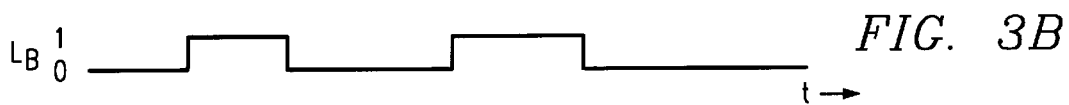
FIG. 3B illustrates a second light function.

FIGS. 3A and 3B illustrate two light functions, $L_A$ and $L_B$, which result from using a particular pattern to display different intensities for two adjacent frames. $L_A$ is a function for a smaller light intensity value than is $L_B$, as indicated by the fewer number of "on" time slices. In FIG. 3, the light functions are from the same pattern, but the same principles apply to light functions from different patterns.

Two light functions can be used to obtain a series light difference function, $D_{AB}$. This function is expressed mathematically as:

$$D_{AB}(i, d, t, t_0) = \sum_{T=1}^{t} [L_A(i+d, T) - L_B(i, T+t_0)]$$

, where d is a pattern-to-pattern intensity difference and $t_o$ is a time offset. For example, if one light function is a function of intensity 128 and the other light function is a function of intensity 127, d=1. If two light functions have the same intensity, d=0. If the same pattern is being compared in two adjacent frames, $t_o$ is one frame period. If different patterns were being compared in the same frame, $t_o$=0.

To calculate $D_{AB}$ from two light functions, $L_A$ and $L_B$, the first step is to calculate a light difference function, $L_A-L_B$. This is simply a matter of subtracting, for each time interval, t, the value (0 or 1) of $L_B$ from the value (0 or 1) of $L_A$. Alternatively, $L_A$ could be subtracted from $L_B$.

Figure 4:
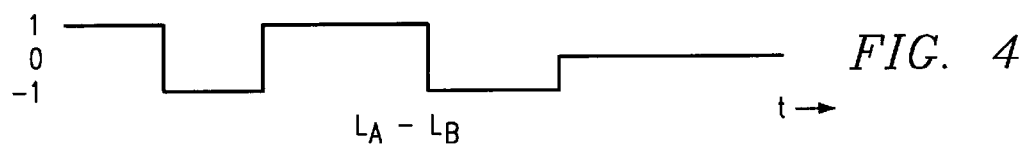
FIG. 4 illustrates a light difference function, derived from the two light functions of FIG. 3.

FIG. 4 illustrates the light difference function, $L_A-L_B$. At each time interval, t, the value of $L_B$ is subtracted from the value of $L_A$. The values of the difference function can be 1, 0, or −1.

After calculating the light difference function, the light difference series function is calculated. At each time interval, t, the previous value of the difference function is added to a current value of the difference function. For example, at the first time interval, the value of the series difference function is 1, at the next time interval 1+1=2, at the third time interval 2+1=3, at the fourth time interval 3+(−1)=2, etc.

Figure 5:
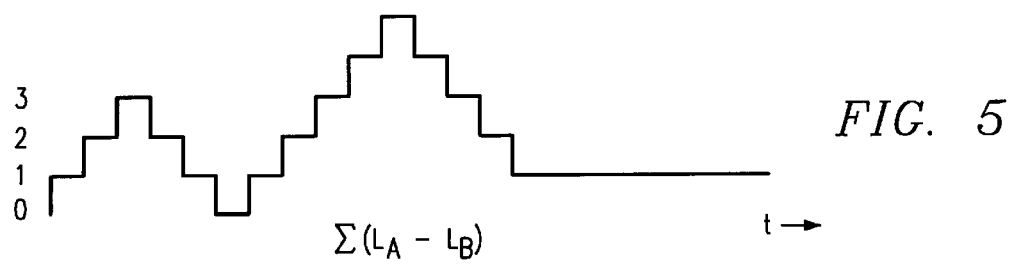
FIG. 5 illustrates a light difference series function, derived from the light difference function of FIG. 4.

FIG. 5 illustrates the series light difference function, $$D_{AB} = \sum_{T=1}^{t} (L_A - L_B).$$

At each time interval, the cumulative sum of the difference function is calculated as the previous value plus the current value.

The light difference series function can be used in a number of "metrics" for evaluating optical characteristics of a PWM pattern or for comparing two PWM patterns for these characteristics. As explained below, these optical characteristics include symmetry, transition error, and uniformity.

Each of these metrics uses a light difference series function that is calculated over one frame period, so that F is the number of time intervals in a frame. Using the PWM example described in the Background, where each pixel has an 8-bit intensity value, there are 256 possible intensities and 255 time intervals per frame. Each metric can be normalized against an ideal response.

In general, each metric uses the series light difference function to obtain a single value representing the desired optical characteristic. This value compares the integrated light energy response associated with a PWM display to the energy response of a different display element in the same frame or to the same or a different display element in a different frame.

A first metric for evaluating a PWM pattern is a symmetry metric, which measures the net imbalance of light at the transition of two patterns, Pattern A and Pattern B (which may be the same). This metric is expressed mathematically as:

$$M1_{AB}(i, d) = \left| [1/(F+1)] \sum_{t=1}^{F} [D_{AB}(i, d, t, 0) - d/2] \right|$$

This metric may be normalized so that zero indicates perfect symmetry. A maximum spread and a maximum peak can also be calculated from the series function in the symmetry metric. Thus, Maxspread=maximumM1$_{AB}$(i,d)−minimumM1$_{AB}$(i,d), and Maxpeak=maximum|M1$_{AB}$(i,d)|.

A second metric for evaluating PWM patterns is a transition error metric, which measures the amplitude and duration of integrated light effects at the transition of two patterns, Pattern A and Pattern B (which may be the same pattern). This metric is essentially a root mean square operation, expressed mathematically as:

$$M2_{AB}(i,d) = \left[ [1/F] \sum_{t=1}^{F} ([D_{AB}(i,d,t,0) - dt/F])^2 \right]^{1/2}.$$

This metric may be normalized so that zero indicates perfect uniformity.

A third metric is a uniformity metric, which uses two accumulated difference functions with a time offset. This metric is expressed mathematically as:

$$M3_{AB}(i,d,t_0) =$$

$$[1/F] \sum_{t=1}^{F} [D_{AB}(i,0,t,t_0) - D_{AB}(i,0,t,0) - i/F]^2.$$

Known computer programming techniques can be used to implement these metrics as computer algorithms.

Appendix A is a listing of the results of using the metrics described above to evaluate a particular PWM pattern. The pattern is described as follows:

7 4 6 7 5 7 6 7 0 1 3 2 7 6 7 5 7 6 7 4 7, where each numeral in the sequence represents a bit-plane having a bit-weight of that value. The bit-planes for bit-weights 7, 6, 5 and 4 are split, such that bit-planes 4 and 5 are each loaded twice, bit-plane 6 is loaded four times, and bit-plane 7 is loaded 9 times. The transition error, symmetry, spread, and peak have been calculated for various intensity differences, specifically, those at transitions from one bit-weight to the next. Also, these values have been averaged for an overall evaluation of the pattern.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

APPENDIX "A"

Base Bit Pattern = 7 4 6 7 5 7 6 7 0 1 3 2 7 6 7 5 7 6 7 4 7
Number of bits = 21    Max bit = 7
Bit number 0 has length = 1
Bit number 1 has length = 2
Bit number 2 has length = 4
Bit number 3 has length = 8
Bit number 4 has length = 8
Bit number 5 has length = 16
Bit number 6 has length = 16
Bit number 7 has length = 14
Error - Avg = 3.707749    Max = 10.182057
Symmetry - Avg = 0.000000    Max = 7.118110
Spread - Avg = 12.066414    Max = 35.000000
Peak - Avg = 6.401643    Max = 21.500000

| From | To | Error | Symmetry | Spread | Peak |
|---|---|---|---|---|---|
| 7 | 8 | 0.656 | −0.059 | 8.000 | 4.500 |
| 15 | 16 | 6.940 | 0.413 | 15.000 | 7.500 |
| 23 | 24 | 0.656 | −0.059 | 8.000 | 4.500 |
| 31 | 32 | 6.701 | −0.469 | 17.000 | 8.500 |
| 39 | 40 | 0.656 | −0.059 | 8.000 | 4.500 |
| 47 | 48 | 6.940 | 0.413 | 15.000 | 7.500 |
| 55 | 56 | 0.656 | −0.059 | 8.000 | 4.500 |
| 63 | 64 | 5.921 | −0.469 | 17.000 | 8.500 |
| 71 | 72 | 0.656 | −0.059 | 8.000 | 4.500 |
| 79 | 80 | 6.940 | 0.413 | 15.000 | 7.500 |
| 87 | 88 | 0.656 | −0.059 | 8.000 | 4.500 |
| 95 | 96 | 6.701 | −0.469 | 17.000 | 8.500 |
| 103 | 104 | 0.656 | −0.059 | 8.000 | 4.500 |
| 111 | 112 | 6.940 | 0.413 | 15.000 | 7.500 |
| 119 | 120 | 0.656 | −0.059 | 8.000 | 4.500 |
| 127 | 128 | 10.182 | 7.118 | 35.000 | 21.500 |
| 135 | 136 | 0.656 | −0.059 | 8.000 | 4.500 |
| 143 | 144 | 6.940 | 0.413 | 15.000 | 7.500 |
| 151 | 152 | 0.656 | −0.059 | 8.000 | 4.500 |
| 159 | 160 | 6.701 | −0.469 | 17.000 | 8.500 |
| 167 | 168 | 0.656 | −0.059 | 8.000 | 4.500 |
| 175 | 176 | 6.940 | 0.413 | 15.000 | 7.500 |
| 183 | 184 | 0.656 | −0.059 | 8.000 | 4.500 |
| 191 | 192 | 5.921 | −0.469 | 17.000 | 8.500 |
| 199 | 200 | 0.656 | −0.059 | 8.000 | 4.500 |
| 207 | 208 | 6.940 | 0.413 | 15.000 | 7.500 |
| 215 | 216 | 0.656 | −0.059 | 8.000 | 4.500 |
| 223 | 224 | 6.701 | −0.469 | 17.000 | 8.500 |
| 231 | 232 | 0.656 | −0.059 | 8.000 | 4.500 |
| 239 | 240 | 6.940 | 0.413 | 15.000 | 7.500 |
| 247 | 248 | 0.656 | −0.059 | 8.000 | 4.500 |

What is claimed is:

1. An interframe method of evaluating a bit sequence pattern for a pulse width modulated display of image data, which is formatted into on or off values of display elements of a display device during a frame period, each sequence providing a light intensity, comprising the steps of:
    specifying a first light function, representing on or off values of one display element of said display elements during a first series of time intervals that comprise a first one of said frame periods;
    specifying a second light function, representing on or off values of said one display element during a second series of time intervals that comprise a next one of said frame periods;
    subtracting said second light function from said first light function, thereby providing a light difference function;
    calculating an intensity difference value, representing the difference between a light intensity resulting from said first light function and a light intensity resulting from said second light function;
    summing values of said light difference function, thereby providing a light difference series function; and
    deriving mathematically, from said light difference series function, a value representing an optical characteristic of said pattern, wherein said deriving step comprises subtracting one-half said intensity difference value from each value of said difference function, summing the results of said subtracting step, and dividing the result of said summing step by the number of said time intervals in one of said frame periods, thereby obtaining a symmetry series function.

2. The method of claim 1, wherein said deriving step comprises subtracting, from said light difference series function at each said time interval, a subtraction term having said intensity difference value as a factor, thereby obtaining a modified series function.

3. The method of claim 1, further comprising the step of determining a maximum value of said symmetry series function.

4. The method of claim 1, further comprising the steps of determining a maximum value and a minimum value of said symmetry series function.

5. The method of claim 1, wherein each of said time intervals has a consecutive interval number, and wherein said deriving step is performed by, at each said time interval, multiplying said intensity difference value times said interval number of that time interval, dividing the result of said multiplying step by the number of said time intervals in one of said frame periods, subtracting the quotient from the value of said difference function, thereby obtaining a modified series function, then using said modified difference function in a root mean square operation.

6. The method of claim 1, further comprising the step of repeating said specifying step, said subtracting step, and said summing steps, thereby providing a second light difference series function, and wherein said deriving step derives said value from said light difference series function and said second light difference series function.

7. An intraframe method of evaluating a bit sequence pattern for a pulse width modulated display of image data, which is formatted into on or off values of display elements of a display device during a frame period, comprising the steps of:

specifying a first light function, representing on or off values of a first one of said display elements during a series of time intervals that comprise one of said frame periods;

specifying a second light function, representing on or off values of a second one of said display elements during said series of time interval;

subtracting said second light function from said first light function, thereby providing a light difference function;

calculating an intensity difference value, representing the difference between a light intensity resulting from said first light function and a light intensity resulting from said second light function;

summing values of said light difference function, thereby providing a light difference series function; and deriving mathematically, from said light difference series function, a value representing an optical characteristic of said pattern, wherein said deriving step is performed by subtracting one-half said intensity difference value from each value of said difference function, summing the results of said subtracting step, and dividing the result of said summing step by the number of said time intervals in one of said frame periods, thereby obtaining a symmetry series function.

8. The method of claim 7, further comprising the step of determining a maximum value of said symmetry series function.

9. The method of claim 7, further comprising the steps of determining a maximum value and a minimum value of said symmetry series function.

10. The method of claim 7, wherein each of said time intervals has a consecutive interval number, and wherein said deriving step is performed by, at each said time interval, multiplying said intensity difference value times said interval number of that time interval, dividing the result of said multiplying step by the number of said time intervals in one of said frame periods, subtracting the quotient from the value of said difference function thereby obtaining a modified series function, then using said modified difference function in a root mean square operation.

11. The method of claim 7, further comprising the step of repeating said specifying step, said subtracting step, and said summing steps, thereby providing a second light difference series function, and wherein said deriving step derives said value from said light difference series function and said second light difference series function.

* * * * *